Feb. 13, 1962  A. E. KUNEN  3,020,819
AIR CONDITIONING CONTROL UNITS
Filed June 6, 1958  2 Sheets-Sheet 1
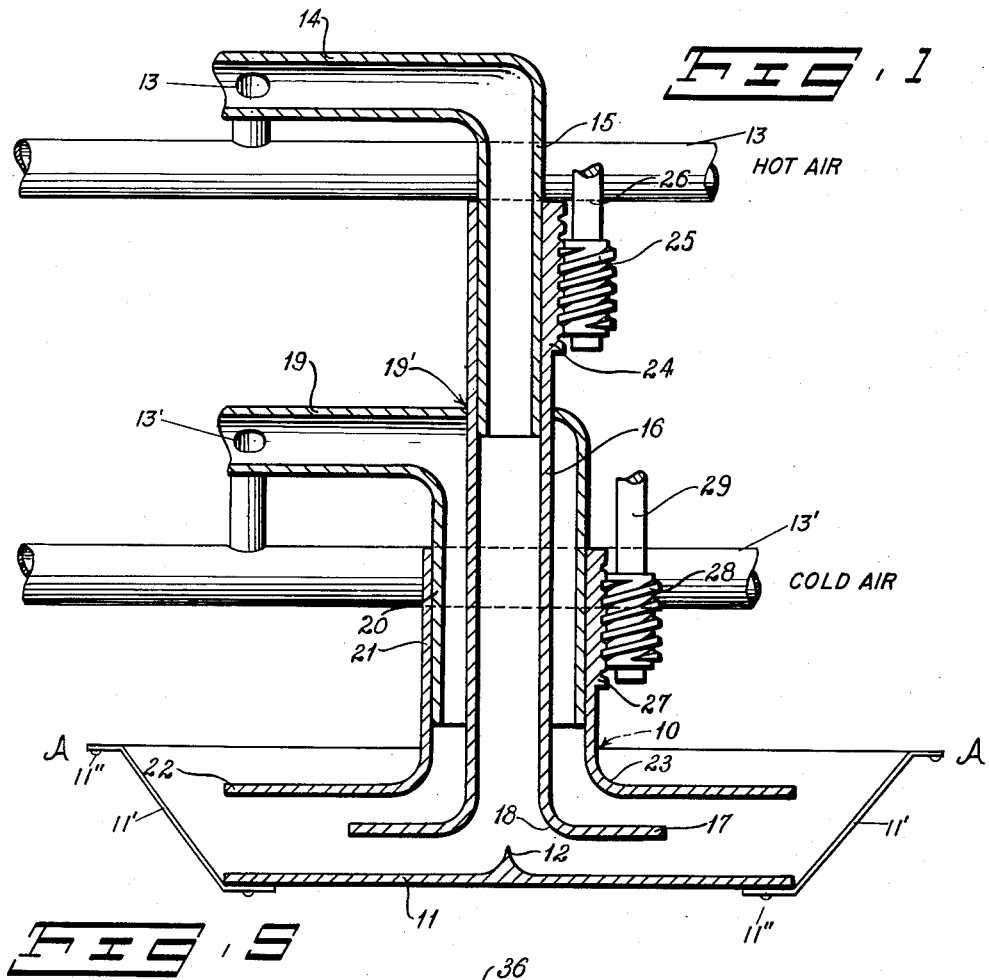
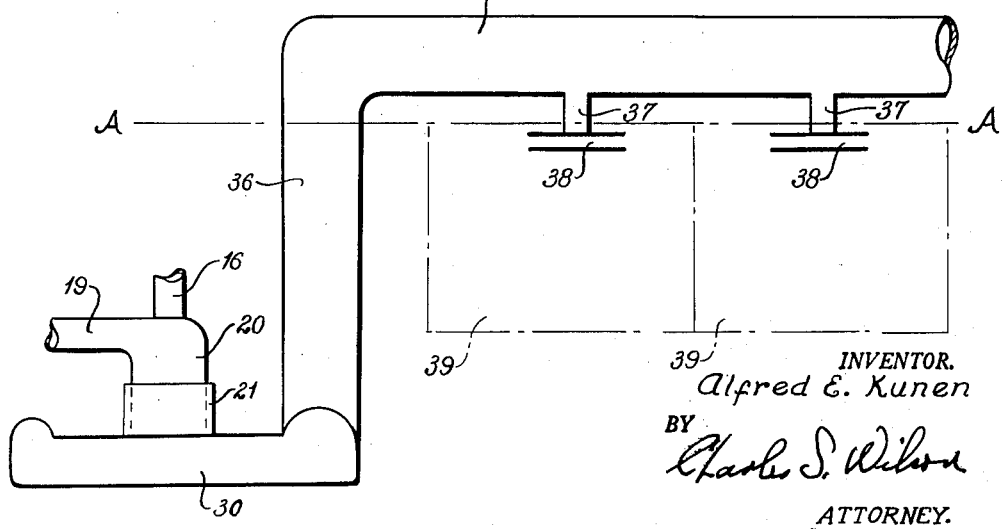
INVENTOR.
Alfred E. Kunen
BY
ATTORNEY.

Feb. 13, 1962  A. E. KUNEN  3,020,819
AIR CONDITIONING CONTROL UNITS
Filed June 6, 1958  2 Sheets-Sheet 2

INVENTOR.
Alfred E. Kunen
BY
Charles S. Wilson
ATTORNEY.

United States Patent Office 3,020,819
Patented Feb. 13, 1962

3,020,819
AIR CONDITIONING CONTROL UNITS
Alfred E. Kunen, 59 Kings Walk, Massapequa Park, N.Y.
Filed June 6, 1958, Ser. No. 740,358
7 Claims. (Cl. 98—38)

This invention relates to control units for "high velocity" air conditioning systems by which the characteristics, such as temperature, volume, velocity etc., of the air delivered by the system may be regulated and determined.

The present control unit may be adapted to serve as an outlet for the direct release of conditioned air into a room or other defined space, or it may be adapted for use in conjunction with a single delivery duct that carries conditioned air to a single relatively large space or to sub-divisions thereof, or is common to a series of rooms or defined areas.

Among its other objects the subject control unit proposes to blend or mix hot and cold air in the proportions required for a desired resulting air temperature and to deliver such mixed or blended air either directly into a defined space or room to be air conditioned, ventilated or heated, or to a supply duct.

Moreover the instant control unit contemplates not only means by which the relative volumes of cold and hot air may be regulated and determined but means by which the supply of either the cold or the hot air or both may be discontinued.

It is intended hereby to accomplish the above as well as other objects with comparatively little noise, reduced velocity and drafts and power economy.

With the above and other objects in view, as will be apparent, this invention consists in the construction, combination and arrangement of parts all as hereinafter more fully described, claimed and illustrated in the accompanying drawings, wherein:

FIG. 1 is a central section through a control unit constructed in accordance with the present invention and adapted for use as room or space outlet;

FIG. 5 is a schematic view disclosing the cooperation of the control unit illustrated in FIGS. 3 and 4 with a single delivery duct and the outlets therefrom.

Figure 3:
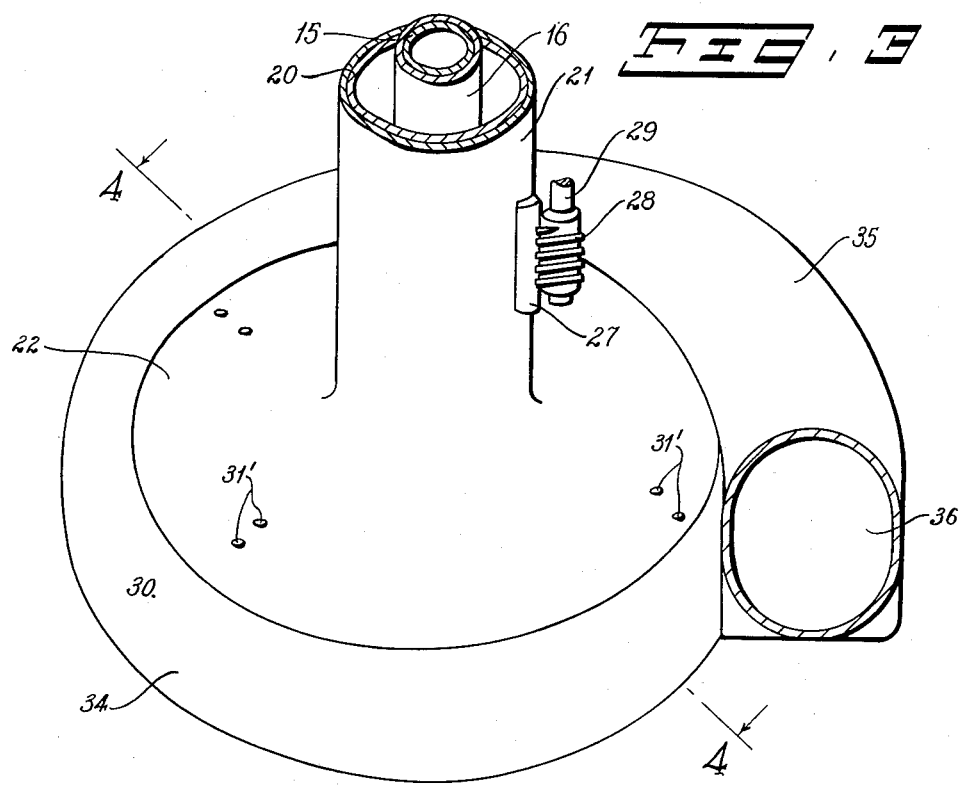
FIG. 3 is a perspective view of the subject control unit adapted for controlling the conditioned air to be supplied by it to a single or common delivery duct.

Many modern air conditioning systems employ high pressure, high velocity air in the supply ducts of the system, such systems being sometimes referred to as "high velocity" systems. These systems customarily employ a hot air duct and a cold air duct from each of which air under pressure is removed and blended or mixed for ultimate use. The proportions of hot and cold air so mixed or blended is determined by the temperature desired for the space being air conditioned. Thus when a lower temperature is desired in said space the flow of the cold air is increased and conversely when a higher temperature is desired the flow of the hot air is increased.

These "high velocity" systems pose at least two (2) problems viz: (a) The release of the blended or conditioned air into the space being air conditioned without creating drafts and (b) the reduction of pressure losses and the conservation of power required for the operation of the system.

Heretofore a relatively large plenum chamber is associated with each defined space, e.g., a room, to be air conditioned and the high pressure and high velocity air from both the cold air duct and the hot air duct are introduced into this chamber where they mix or blend to establish the desired temperature for the air ultimately to be delivered from the chamber. Of course, the quantities of hot and cold air fed to the plenum chamber can be appropriately and proportionately regulated by suitable valves and on occasion, if it be desired, only cold or hot air may be supplied to and delivered from the plenum chamber.

In any event the air fed to and released in the plenum chamber is turbulently mixed or blended and has its velocity reduced in the process. Hence air at the required temperature can be discharged from the chambers into the space or room to be air conditioned at appreciably reduced velocity.

The "high velocity" air conditioning systems, such as briefly and sketchily described above, are, inter alia, open to several objections, viz:

(1) The plenum chamber individual to each defined space or room to be air-conditioned is expensive to install and conceal within or behind a wall or ceiling defining such space.

(2) The release of the air under pressure into the plenum chamber develops turbulence incidental to the mixing of the air (hot and cold) and reducing its velocity. This generates noise that is annoying and is power consuming as well.

(3) Greater power is required to impel the hot and cold air through their respective conduits, deliver the air from the conduits to a plenum chamber, and turbulently mix or blend the air therein, than is needed to impel such air through the conduits and discharge it directly from the conduits into the space to be air conditioned.

The present invention proposes to eliminate the foregoing and other objections in "high velocity" systems by doing away with the plenum chamber, the valves interposed between the air ducts or conduits and such chamber and yet mix the hot and cold air, regulate and determine the proportions thereof and reduce the air velocity all by a single unit. The subject unit may be embodied in or constitute an outlet in each individual room or defined space to be conditioned: Or it may be employed as a central control unit from which the mixed or blended air may be conducted to a number of points in a large space, or to outlets individual to each of a plurality of rooms or defined spaces to be conditioned. In the first instance or example the temperature of each room or defined space may be independently regulated and determined while in the second instance or example the entire large space or sub-division thereof and all of the rooms to be conditioned will be supplied with air at the same temperature. The only regulation or control of volume or temperature will be at said central control unit.

Figure 2:
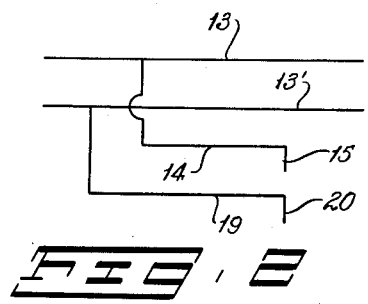
FIG. 2 is a diagrammatic or schematic view illustrating the coaction between the individual supply ducts for hot and cold air with the instant control unit.

In FIG. 1 is disclosed an air conditioning control unit constructed in accordance with the present invention used as room outlet for the delivery of conditioned air to a room or limited defined space. FIG. 2 schematically illustrates the ducting by which this outlet is associated with the cold and hot air ducts of a high velocity system.

Here the ceiling or wall of the room or defined space is denoted A—A and it is pierced by an opening 10 through which air, both hot and cold may be delivered. A radial diffuser comprising a plate 11 is fixedly secured parallel to and spaced from the wall or ceiling A—A with its center in substantial alignment with the axis of the opening 10. Several straps or brackets 11' extend between the periphery of the fixed plate 11 and the wall or partition A—A, being secured thereto at their ends by screws 11" or equivalent attaching means. Thus, the plate 11 is supported against movement, spaced from and parallel to the wall or partition A—A. This plate 11 can have any peripheral outline or contour and at its center in alignment with the center of the opening 10 is provided with a conical projection or deflector 12. The surface of the projection 12 not only slopes outwardly toward the perimeter of the plate 11 but is curved to merge with the inner face of the plate 11. Thus air impacting the center of the immovable plate 11 is divided and directed uniformly in all directions toward the edge of the plate 11, and in being so deflected and moving radially outward as directed by the plate has its velocity reduced.

From a hot air duct 13 a stationary leader 14 is provided to remove hot air under pressure from said duct and conduct it for delivery through the opening 10 to the room or space to be conditioned. This leader 14 terminates in a right angularly disposed nozzle 15 normal to the plate 11 and concentric with respect to the projection 12 on the plate 11. It is to be noted that the nozzle 15 does not pass through the wall or ceiling opening 10 but terminates inwardly of and hence has its extremity spaced from the inner surface of such wall or ceiling.

To conduct hot air from the nozzle 15 to and through the opening 10 an extension sleeve 16 snugly encircles and is slidable on said nozzle. This sleeve 16 forms a continuation of the nozzle 15 and passes through the ceiling or wall opening 10 to have its outer extremity disposed between the plate 11 and the outer or exposed surface of said ceiling or wall A—A where it is provided with an outstanding flange 17. The flange 17 is approximately parallel to the plate 11 and its surfaces merge with the surface of the sleeve 16, as at 18. Like the plate 11 any peripheral outline may be imparted to the outer edge of the flange 17 though it is preferred that it correspond to the edge contour of the plate 11 and that its edge terminates inwardly of the edge of the plate 11. Stated differently the area of the flange 17 and its reach with reference to the projection 12 is less than the area and reach of the plate 11 relative to the projection 12.

From the cold air duct 13' a stationary leader 19 is provided to remove cold air under pressure from said duct and conduct it to the room or space to be air conditioned. This leader 19 terminates in a right angularly disposed nozzle 20 which is normal to the plate 11 and concentric to the projection 12. This nozzle 20 having a greater diameter than the sleeve 16 concentrically contains and is spaced outwardly from said sleeve. Both the nozzle 15 and the sleeve 16 pass through an opening 19' at the junction between the nozzle 20 and the leader 19, so that the sleeve 16 can reciprocate through such opening.

To conduct cold air from the nozzle 20 to and through the opening 10 an extension sleeve 21 is snugly mounted to reciprocate on the nozzle 20. This sleeve 21 forms a continuation of the nozzle 20 and is concentric relative to the nozzle 20, the sleeve 16 and nozzle 15 as well as being normal to the plate 11 and flange 17. It also passes through the opening 10 in the wall or ceiling A—A to terminate between the flange 17 and the outer face of the wall or ceiling A—A where it is provided with an outstanding flange 22. The surfaces of the flange 22 and of the sleeve 21 merge, as at 23 and said flange 22 is substantially coextensive with the plate 11 in that its outer edge is disposed in direct alignment with the edge of the plate 11. Therefore the flange 22 has a greater reach and area than the flange 17 carried by the sleeve 16 and is positioned approximately parallel to the fixed plate 11 and to the flange 17.

It is manifest from the foregoing that, by virtue of the reciprocable mounting of the sleeves 16 and 21, the flanges 17 and 22 respectively carried thereby may be adjusted relatively to each other and relatively to both the fixed diffusing plate 11 and wall or ceiling A—A. For the adjustment of the sleeves 16 and 21 respectively on the nozzles 15 and 20 the sleeve 16 may be provided with an exterior worm rack 24 to mesh with a worm gear or pinion 25 fixed on a rotary shaft 26. Similarly the sleeve 21 may be provided with an exterior worm rack 27 to mesh with a worm gear or pinion 28 fixed on a rotary shaft 29.

By rotating the shafts 26 and 29 independently or in unison the positions of the sleeves 16 and 21 respectively on the nozzles 15 and 20 may be individually or simultaneously adjusted longitudinally of said nozzles in either direction depending on the directions in which the shafts 26 and 29 are rotated. In this manner the spaces between the plate 11 and the flanges 17 and 22 and between the flange 22 and the wall or ceiling A—A can be increased or decreased. As the space between the flange 17 and plate 11 is increased the greater the volume of hot air released over and diffused by the plate 11 and conversely as such space is decreased so will the volume of hot air be reduced. Likewise as the space between the flanges 17 and 22 is increased the greater the volume of cold air released and conversely as this space between the flanges is decreased so will the volume of cold air be reduced.

Hot air delivered by the sleeve 16 impacts the plate 11 at and around the projection or deflector 12. This changes the flow of hot air from normal to plate 11 to parallel to said plate and directs the air uniformly in all directions toward the edge of said plate; while cold air delivered by the sleeve 21 impacts the flange 17 adjoining the sleeve 16 to have its direction of flow similarly changed and be directed uniformly in all directions toward the edge thereof. Beyond the edge of the flange 17 the hot and cold air being thus diffused mingle to be delivered at lowered velocity and at the required temperature into the space to be air conditioned from between the edge portions of plate 11 and flange 22. The supply of either hot or cold air may be entirely discontinued by placing the flange 17 in flush abutment with plate 11 or the flange 22 in flush abutment with the flange 17. If the flange 22 rests flush against the flange 17 and the latter rests flush against the plate 11 the flow of substantially all air (hot and cold) from the unit is arrested. By regulating the relative positions of the flanges 17 and 22 the volume of cold and hot delivered by the unit may be determined. Moreover the total volume of air may be reduced or increased without altering the mixture or proportions of hot and cold air.

The use of the rack and pinion mechanisms for the adjustment of the sleeves 16 and 21 on their respective nozzles 15 and 20 is merely illustrative of one means for accomplishing this function. Obviously many alternative and equivalent means may be employed; hence the specific means of adjustment forms no part of this invention.

Similarly the specific means for the rotation of the shafts 26 and 29 forms no part of the present invention. This means may be manual, mechanical, hydraulic or electronic and may be operated automatically in response to ambient conditions in the space or room being air conditioned.

In practice at least one control unit as disclosed in FIG. 1, is provided in each room or defined area to be air conditioned and may be situated in association with the ceiling or a wall defining such room or area. Of course, more than one unit or outlet may be provided in each room or space to be conditioned. Under these circumstances every control unit in a room or area to be air conditioned serves as an air outlet and may be individually adjusted and regulated to control the characteristics of the air delivered by it.

Figure 4:
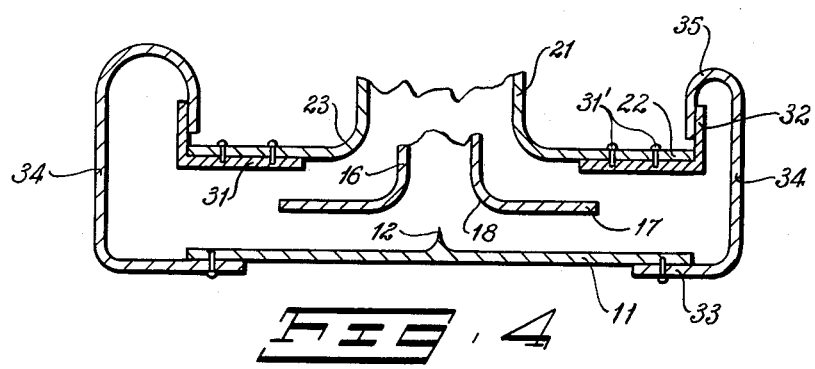
FIG. 4 is a central section taken along line 4—4 of FIG. 3.

FIGS. 3 to 5 illustrate a modification of this invention where a single control unit may be used to prepare the air at the desired temperature for delivery to any one or all of a series of rooms or areas. When the modified device of FIGS. 3 and 4 is used all of the connected rooms or areas receiving conditioned air will be maintained at substantially the same temperature, and no independent variation in the characteristics of the air delivered to an individual room or area is contemplated.

This modified unit operates substantially as does the unit of FIG. 1. About the only difference resides in the provision of an accumulator 30 in association with the edges of the plate 11 and flange 22 to receive the mingled air from between the edge portions of these elements and deliver it to a delivery duct. In the sectional view of FIG. 4 is shown a construction by which the accumulator 30 may be associated with the unit so as to permit the adjustment of the flange 22 and sleeve 21 relative to the cooperating nozzle 20 without interfering with the air flow from between the plate 11 and flange 22 to the accumulator 30. To that end a ring 31 is riveted or otherwise attached to or formed at the edge portion of the flange 22. At its outer edge this ring 31 has an integral lip 32 positioned at right angles to the ring and resting against the edge of the flange 22. Thus as the flange 22 moves with the sleeve 21 relative to the nozzle 20 so moves the ring 31 and its lip 32.

A somewhat similar ring 33 is riveted or otherwise secured to or formed at the edge portion of the plate 11. This ring has a gradually increasing width and is provided with a right angularly disposed lip 34 having a greater width than the maximum distance between the plate 11 and the flange 22. At its extremity the lip 34 merges into a rebent hood 35 that overlaps and contains the free edge portion of the lip 32 carried by the flange 22. Thus the flange 22 and associated parts can be adjusted with respect to the stationary plate 11, ring 33, lip 34 and hood 35 without becoming disengaged from the hood or permitting any appreciable or material escape of air. Due to the gradual increase in the width of the ring 33 the cross sectional area of the accumulator 30 gradually increases until the accumulator unites with or becomes the delivery duct 36. In short the accumulator 30 is a conduit which receives all air discharged from between the flanges 17 and 22 and the plate 11 and conveys it to the duct 36 from which leaders 37 deliver the air from said duct to the room outlets 38 for ultimate release in the rooms or areas 39.

Appropriate seals can be provided in the subject control unit where needed to reduce leakage or the escape of air. Since the seals per se and their location may vary widely no seals are shown or located in either the control unit or the system. Any suitable or adaptable seals may be used anywhere in the control unit and associated system without departing from the spirit and scope hereof.

Likewise the details of construction as described and illustrated herein may be changed, varied and altered within the limits of this invention; the illustrated and described structure merely being illustrative of one way of carrying out the instant invention.

What is claimed is:

1. A control unit for mixing and regulating the relative volumes of hot air and cold air flowing from a pair of separate supply pipes, comprising a pair of independent concentric, tubular air nozzles aligned longitudinally and one nozzle having a greater diameter than the other, a sleeve individual to and mounted for sliding movement on each nozzle, means for individually sliding the sleeves along the tubular nozzles to provide longitudinal adjustment thereof, the sleeve on the smaller nozzle concentrically passing through the other sleeve and nozzle, said sleeves constituting independent extensions of their respective nozzles, parallel outstanding flanges carried by the ends of said sleeves remote from the nozzles and one of said flanges having a greater width than the other, and a stationary diffusing plate mounted adjacent and parallel to said flanges so as to dispose the smaller flange between the plate and the larger flange, whereby adjustment of the position of the sleeves by sliding movement thereof correspondingly varies the spacing of the flanges relative to each other and to the diffusing plate to control the volumes of hot air and cold air allowed to flow out therebetween.

2. A control unit for cooperation with and control of independent longitudinally aligned air nozzles comprising a sleeve snugly fitting and mounted for sliding adjustment on each nozzle, one of said sleeves concentrically passing through the other nozzle and its coacting sleeve, parallel outstanding flanges carried by the ends of said sleeves remote from the nozzles, the flange carried by the inner sleeve being narrower than that carried by the outer sleeve, a stationary diffusing plate arranged parallel to and extending beyond the edge of the narrower flange thereby situating the narower flange between said plate and the wider flange, and means for adjusting the positions of the sleeves on the nozzles and the flanges relatively to each other and to said plate.

3. A control unit for mixing and regulating the relative volumes of hot air and cold air flowing from a pair of separate supply pipes, comprising a pair of concentrically disposed and longitudinally aligned independent tubular air nozzles each adapted to discharge air having a temperature different from that discharged by the other, a concentric, snugly engaging tubular sleeve individual to and mounted for sliding movement on and forming a continuation of each nozzle, one of said sleeves concentrically passing through the other sleeve and its associated nozzle, parallel, spaced, outstanding flanges fixedly carried by the ends of said sleeves remote from the nozzles and the flange carried by the inner sleeve being narrower than that carried by the outer sleeve, a stationary diffusing plate arranged adjoining and extending beyond the edge of the narrower flange, said plate receiving and outwardly deflecting the discharge of the inner sleeve and the narrower flange receiving and outwardly deflecting the discharge of the outer sleeve, and means for individually sliding the sleeves along the tubular nozzles thereby to regulate the relative spacings of the flanges to each other and to the stationary diffusing plate, said spacings being adjustable between open positions wherein the relative volumes of hot air and cold air allowed to flow out therebetween are controlled and closed positions wherein the flow of either or both of the hot air and the cold air is shut off.

4. A control unit for cooperation with and control of a pair of nozzles, arranged in tandem on a common axis, one nozzle having a greater diameter than the other, a sleeve individual to and snugly mounted for movement longitudinally of each nozzle, the sleeve mounted on the smaller nozzle passing through and spaced from the larger nozzle and its sleeve, a diffusing plate mounted against movement across the ends of said sleeves to direct the discharge of the smaller sleeve laterally toward the edge of said plate, an outstanding flange on the smaller sleeve, disposed parallel to the diffusing plate and terminating inwardly of its edge, said flange to direct the discharge of the larger sleeve laterally toward the edge of said flange, a second outstanding flange at the end of the larger sleeve substantially coextensive with the plate and disposed parallel to both the plate and the flange on the smaller sleeve, and means for independently adjusting said sleeves longitudinally of their respective nozzles to regulate the relative spacing of the flanges and diffusing plate.

5. A control unit for a pair of nozzles comprising a sleeve mounted for longitudinal adjustment on each nozzle, a relatively wide outstanding flange on one of said sleeves, a fixed plate disposed across the ends of said sleeves, a comparatively narrow outstanding flange on the other of said sleeves disposed between the plate and said wide flange, said flanges and plate being substantially parallel one to the other, a lip normal and secured to the edge portion of the wider flange, a relatively wide lip attached and normal to the edge portion of the fixed plate, and a hood at the extremity of the lip on the plate adapted to extend over and slideably engage the lip on the wider flange.

6. A control unit for a pair of air nozzles comprising a sleeve mounted for longitudinal adjusting movement on each nozzle having open ends, a stationary plate disposed across the open ends of said sleeves, a relatively narrow outstanding flange carried by one sleeve, a comparatively wide outstanding flange carried by the other sleeve, the flanges and plate being substantially parallel with the narrow flange positioned between the plate and the wide flange, an accumulator interposed between the edge portions of the wide flange and the stationary plate, means for independently adjusting said sleeves relatively to their respective nozzles, and means whereby said accumulator accommodates the movements of said flanges relative to each other and to the plate.

7. A control unit for a pair of air nozzles comprising a sleeve mounted for longitudinal adjusting movement on each nozzle having open ends, a fixed plate disposed across the open ends of said sleeves, a relatively narrow outstanding flange carried by one sleeve, a comparatively wide outstanding flange carried by the other sleeve, the flanges and plate being substantially parallel with the narrow flange positioned between the plate and the wide flange, an accumulator interposed between the edge portions of the wide flange and the fixed plate to receive the air discharged by both nozzles and direct it to a supply conduit, said accumulator having an increasing cross sectional area, means for adjusting said sleeves and attached flanges relative their respective nozzles and to the fixed plate, and means for maintaining an approximately air tight connection between said accumulator and the flange and plate regardless of the adjustment of said sleeves and flanges.

References Cited in the file of this patent
UNITED STATES PATENTS

| | | |
|---|---|---|
| 2,355,294 | Herbster | Aug. 8, 1944 |
| 2,418,266 | Kurth | Apr. 1, 1947 |
| 2,531,733 | Honerkamp | Nov. 28, 1950 |
| 2,772,624 | Carnes | Dec. 4, 1950 |
| 2,848,936 | Vallero | Aug. 26, 1958 |